(12) United States Patent
Haustein et al.

(10) Patent No.: US 10,208,819 B2
(45) Date of Patent: Feb. 19, 2019

(54) MOTOR VEHICLE ACTUATOR, IN PARTICULAR BRAKE ACTUATOR

(71) Applicant: KUSTER HOLDING GmbH, Ehringshausen (DE)

(72) Inventors: Martina Haustein, Weilburg (DE); Oliver Keller, Nister-Mohrendorf (DE); Axel Fritz, Wettenburg (DE); Thomas Kramer, Dautphetal (DE)

(73) Assignee: Kuster Holding GmbH, Ehringshausen (DE)

( * ) Notice: Subject to any disclaimer, the term of this patent is extended or adjusted under 35 U.S.C. 154(b) by 138 days.

(21) Appl. No.: 15/309,851

(22) PCT Filed: May 5, 2015

(86) PCT No.: PCT/EP2015/059800
§ 371 (c)(1),
(2) Date: Jun. 19, 2017

(87) PCT Pub. No.: WO2015/173066
PCT Pub. Date: Nov. 19, 2015

(65) Prior Publication Data
US 2017/0335910 A1 Nov. 23, 2017

(30) Foreign Application Priority Data
May 13, 2014 (DE) .......... 10 2014 106 732

(51) Int. Cl.
*B60T 13/74* (2006.01)
*F16D 65/00* (2006.01)
(Continued)

(52) U.S. Cl.
CPC ........ *F16D 65/0018* (2013.01); *B60T 13/741* (2013.01); *F16D 65/0006* (2013.01);
(Continued)

(58) Field of Classification Search
CPC ...... F16D 65/00; F16D 65/14; F16D 65/0018; F16D 65/52; B60T 13/741; B60T 13/746
(Continued)

(56) References Cited

U.S. PATENT DOCUMENTS 2,044,649 A * 6/1936 Swennes .............. F16F 3/10
217/54
2,117,433 A * 5/1938 Krebs .................. F01L 1/16
123/188.13
(Continued)

FOREIGN PATENT DOCUMENTS

| DE | 10064803 C1 | 12/2002 |
|---|---|---|
| DE | 102004048700 A1 | 5/2006 |
| DE | 102010032053 A1 | 1/2012 |
| WO | 2008/050203 A1 | 5/2008 |
| WO | 2011/076366 A1 | 6/2011 |

*Primary Examiner* — Christopher P Schwartz
(74) *Attorney, Agent, or Firm* — Rogowski Law LLC

(57) ABSTRACT

The invention relates to a motor vehicle actuator, in particular a brake actuator, comprising a housing (3) which consists of a housing container (1) and a housing cover (2) designed as a base support, and in which an electric motor (4) and a transmission (6) coupled to the electric motor via a torque transmitting device (5) are arranged. A retaining frame which can be arranged on the housing cover (2) is provided in order to arrange the electric motor (4) within the housing (3). The invention is characterized in that the holding frame (7) is designed as a damping and/or spring device.

17 Claims, 3 Drawing Sheets

(51) Int. Cl.
*F16D 65/18* (2006.01)
*F16D 65/14* (2006.01)
*F16D 121/24* (2012.01)
*F16D 125/50* (2012.01)
*F16D 125/52* (2012.01)
*F16D 125/48* (2012.01)
*F16D 125/58* (2012.01)

(52) U.S. Cl.
CPC ............. *F16D 65/14* (2013.01); *F16D 65/18* (2013.01); *F16D 2121/24* (2013.01); *F16D 2125/48* (2013.01); *F16D 2125/50* (2013.01); *F16D 2125/52* (2013.01); *F16D 2125/582* (2013.01); *F16D 2250/0084* (2013.01)

(58) Field of Classification Search
USPC .................................................. 188/156–164
See application file for complete search history.

(56) References Cited

U.S. PATENT DOCUMENTS

| | | | | |
|---|---|---|---|---|
| 2,400,468 | A * | 5/1946 | Sacher | F16D 65/52 188/79.53 |
| 4,029,166 | A * | 6/1977 | Haak | B62D 55/125 180/9.62 |
| 4,305,484 | A * | 12/1981 | Bradley | F16D 65/0979 188/73.32 |
| 4,645,187 | A * | 2/1987 | Kanjo | B61G 3/04 213/33 |
| 7,021,415 | B2 * | 4/2006 | Farmer | B60T 13/741 180/275 |
| 2009/0050420 | A1 * | 2/2009 | Poertzgen | B60T 13/746 188/156 |
| 2012/0325601 | A1 * | 12/2012 | Giering | F16D 65/0006 188/162 |
| 2013/0180811 | A1 * | 7/2013 | Poertzgen | B60T 13/741 188/156 |

* cited by examiner

MOTOR VEHICLE ACTUATOR, IN PARTICULAR BRAKE ACTUATOR

CROSS-REFERENCE TO RELATED APPLICATIONS

This application is a national stage application (under 35 USC § 371) of PCT/EP2015/059800, filed May 5, 2015, which claims benefit of German application No. 10 2014 106 732.0, filed May 13, 2014, the contents of each of which are incorporated by reference herein.

BACKGROUND OF THE INVENTION

Technical Field and State of the Art

The present invention relates to a motor vehicle actuator, especially a brake actuator.

U.S. Pat. No. 7,021,415 B2 discloses such a motor vehicle actuator, especially a brake actuator. It is configured as an electrically driven brake actuator that comprises an electric motor for generating a torque and a device for transmitting torque as well as a transmission to which the torque is transmitted. With this brake actuator, the torque transmitting device is configured as a drive belt that is operatively connected, on the one hand, to a spur gear arranged on the drive shaft of the electric motor and, on the other hand, to another spur gear mounted on the drive shaft of the transmission. Here, the transmission as well as the electric motor and the torque transmitting device are arranged in a shared housing that consists of a container and a housing cover. Thus, the motor as well as the transmission are arranged inside the housing on a holding means configured as an auxiliary frame.

In order to minimize the generation of noise during the operation of the motor vehicle due to vibrations and similar occurrences caused by the movement of the individual components inside the housing of the brake actuator, there are various cushioning and damping elements situated between the individual components such as, for example, between the holding means and the electric motor as well as between the holding means and the housing cover. These individual cushioning and vibration elements are all configured as separate components so that each individual element has to be handled separately during the assembly. This renders the assembly very laborious and there is also a need to keep a wide variety of individual components in stock in order to produce the brake actuator.

Before this backdrop, it is an objective of the invention to refine a motor vehicle actuator in such a way that the assembly is simplified, whereby at the same time, the number of components can be reduced.

SUMMARY OF THE INVENTION

A motor vehicle actuator according to one embodiment of the invention has a housing which consists of a container and a housing cover configured as a base support and in which an electric motor and a transmission coupled to it via a torque transmitting device are arranged. Here, in order to arrange the electric motor inside the housing, a holding frame is provided that can be arranged on the housing. The motor vehicle actuator according to the invention is characterized in that the holding frame is now configured as a damping and/or cushioning means or spring device.

Thanks to the configuration of the holding frame as a damping and/or cushioning means or spring device, it is easily possible to dispense with separate damping and/or cushioning means or elements during the production of such a motor vehicle actuator. Consequently, a reduction in the number of components is achieved in a simple manner, and this also leads to a greatly simplified assembly of the motor vehicle actuator. The use of such a holding frame makes it possible to simplify the assembly in that the transmission can be arranged separately on the housing cover that is configured as a base support, along with the torque transmitting device, and so can the holding frame according to the invention onto which the electric motor is mounted in the final step. In order to attain the noise minimization needed for adequate comfort during the operation of such a motor vehicle actuator, according to the invention, it is no longer necessary to employ separate cushioning and/or damping elements during the assembly since, owing to the configuration according to the invention, the holding frame already has damping and cushioning properties that are sufficient for an appropriate noise minimization during the operation of the motor vehicle actuator. Moreover, the motor vehicle actuator according to the invention can be built sequentially, starting from the housing cover, in that the individual components are mounted on it one after the other. During the assembly, it is not necessary to produce intermediate stages made up of several individual components that then have to be installed as a multi-part intermediate product during the assembly of the motor vehicle actuator. Thus, the assembly of the motor vehicle actuator is considerably simplified by the invention so that, as a result, the assembly effort can be markedly reduced. Furthermore, no additional production line has to be operated in which the individual components for the intermediate stages have to be assembled before being mounted in the motor vehicle actuator during its further production.

According to a first advantageous embodiment of the invention, the holding frame has a base frame onto which at least one damping and/or cushioning element or spring device is shaped, whereby this element is preferably configured as a single piece with the base frame, and preferably as a spring tongue. Owing to this configuration of the embodiment, the cushioning and damping properties of the holding frame according to the invention can be attained in a simple manner.

In this context, it has proven to be advantageous for the holding frame, together with the damping and/or cushioning elements, to be made of a plastic by means of an injection-molding process. Such processes are technically advanced, so that the desired cushioning and damping properties of the holding frame can be adapted to all kinds of motor vehicle actuators as a function of their characteristics.

According to another idea of the invention, the holding frame has a holding means for the electric motor, whereby the holding means preferably has a contact surface on which the electric motor, which has a contact surface, can be arranged. As a result, it is possible to arrange the electric motor securely on the holding frame in a simple manner.

So that the holding frame cannot move inside the housing of the motor vehicle actuator and cannot give rise to an undesired generation of noise, it is provided for a support to be shaped onto the holding means and to rest directly on the housing cover which is configured as a base support, where it is also securely held in an appropriate holder or support receptacle.

In order to allow the electric motor to also be arranged on the holding means in such a way that it cannot shift or rotate, there are fixation elements which are arranged on the holding means and which correspond to counter-fixation elements of the electric motor. Preferably, these fixation elements and counter-fixation elements are configured so as to create a positive fit relative to each other.

For purposes of operatively connecting the electric motor to the torque transmitting device, it is provided for the holding means to have an opening through which a drive shaft of the electric motor, together with a driving gear wheel arranged on said drive shaft, can be inserted.

Moreover, it has proven to be advantageous for the transmission of the motor vehicle actuator to be configured as a planetary gear train. This translates into a very compact transmission so that the entire motor vehicle actuator can be built so as to be relatively compact.

According to another advantageous embodiment of the invention, the torque transmitting device is configured as a double gear wheel. Such a double gear wheel has the advantage that the operative connection of the torque transmitting device to the electric motor as well as to the transmission can be achieved within a relatively small installation space.

In this context, it has also proven to be advantageous for shoulders to be provided on the housing cover on which the damping and/or cushioning elements or spring devices of the holding frame or of the base frame can be supported, so that the base frame is arranged in such a manner that it is contact-free above the torque transmitting device, which is configured as a double gear wheel. Thus, the electric motor can easily be brought into operative connection with the double gear wheel via its drive shaft and via the driving gear wheel arranged on it, without the base frame of the holding frame or another component of the holding frame being in contact with the double gear wheel, since this could, in turn, give rise to the generation of noise during operation.

So that the double gear wheel can easily transmit the torque to the transmission, it is also provided for the double gear wheel to be operatively connected, on the one hand, to the driving gear wheel of the electric motor and, on the other hand, to a spur gear that is arranged on the drive shaft of the transmission.

Additional objectives, advantages, features and application possibilities of the present invention can be gleaned from the description below of an embodiment making reference to the drawing. In this context, all of the described and/or depicted features, either on their own or in any meaningful combination, constitute the subject matter of the present invention, also irrespective of their compilation in the claims or in the claims to which they refer back.

DETAILED DESCRIPTION

The figures show an embodiment of a motor vehicle actuator according to the invention, which is configured here as a brake actuator.

Figure 1:
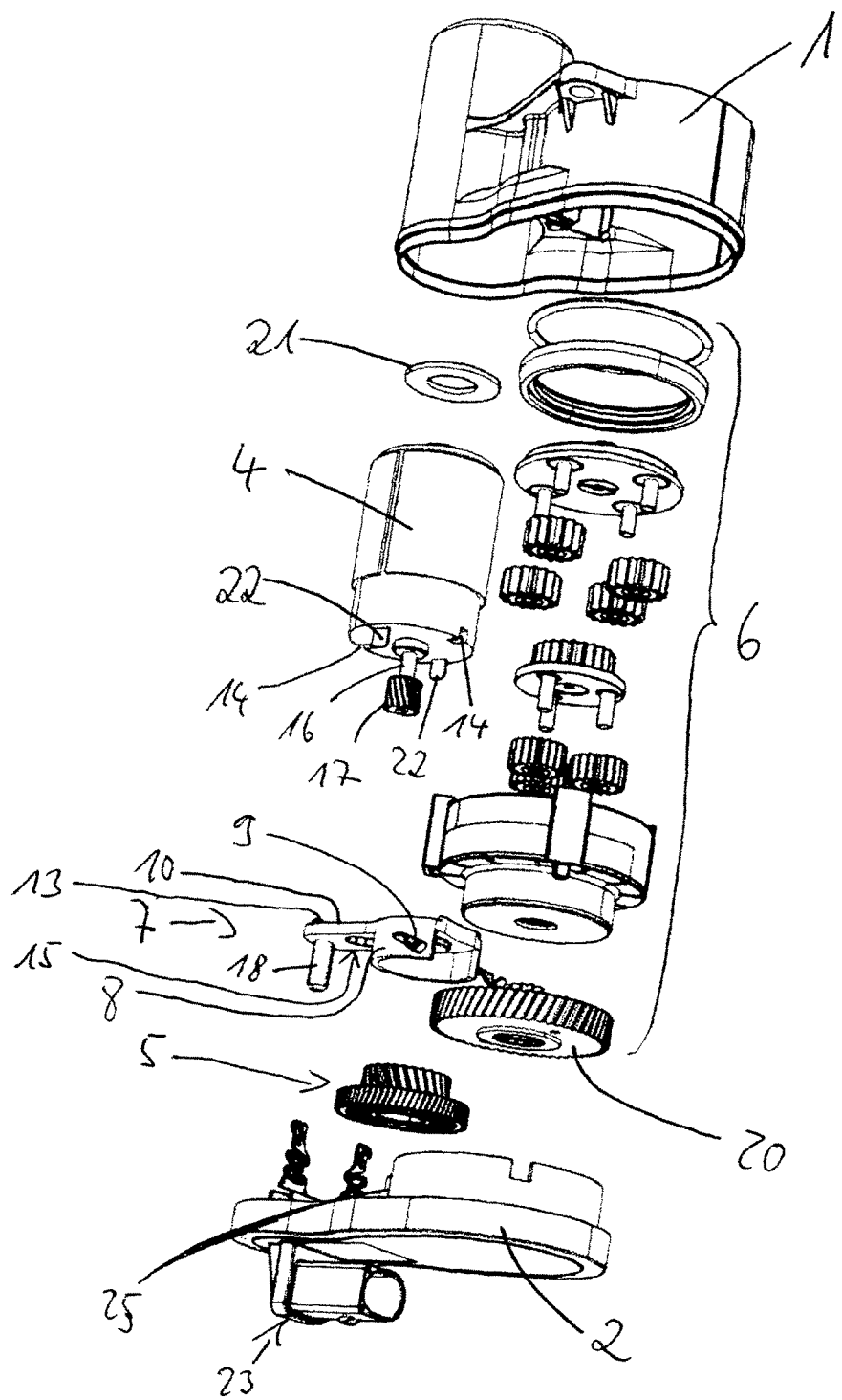
FIG. 1 an embodiment of a motor vehicle actuator according to the invention, in an exploded view, FIG. 2 the motor vehicle actuator according to FIG. 4, in a cross sectional view, FIG. 3 a detailed view of FIG. 1 in the area of the holding frame, and FIG. 4 the housing cover of the embodiment of FIGS. 1 and 2, with components already arranged in it.

The individual elements or components of the motor vehicle actuator can be seen in the exploded view of FIG. 1.

Essentially, the housing 3 consists of the housing cover 2 and of the container 1 with the further components of the motor vehicle actuator which are arranged in the housing 3 and which are described below.

A torque transmitting device 5 is arranged on the base support 2 on a bearing 25 and in this case, the torque transmitting device 5 is configured as a double gear wheel. Here, a holding frame 7 is arranged above this torque transmitting device 5. This holding frame 7 consists essentially of a holding means 10 with the base frame 8 arranged on it, whereby the base frame 8 is configured to be arranged above the torque transmitting device 5, while the holding means 10 is arranged below the electric motor 4.

The holding means 10 has an opening 15 through which a drive shaft 16 of the electric motor 4 with a driving gear wheel 17 arranged on said electric motor 4 can be inserted. Moreover, the holding means 10 has a support 18 that faces the housing cover 2 and that, when in the mounted state, rests on the housing cover 2 while being held in a support receptacle 24. Damping and/or cushioning elements 9 are shaped onto the base frame 8 of the holding frame 7. Moreover, the holding means 10 has a contact surface 11 onto which the electric motor 4 having a contact surface 12 can be placed.

In order for the electric motor 4 to be affixed relative to the holding frame 7 so that it cannot shift or rotate, there are fixation elements 13 that are shaped onto the holding frame 7 or onto the holding means 10 and that appropriately correspond to counter-fixation elements 14 of the electric motor 4, so that they preferably engage with each other with a positive fit, thereby preventing any rotation or shifting of the electric motor 4 on the holding frame 7.

All of the above-mentioned individual components of the holding frame 7 are configured as a single piece with said holding frame 7. In other words, the holding frame 7 is configured as a single piece comprising the base frame 8, the damping and/or cushioning elements 9, the holding frame 10 with the contact surface 11 and the fixation elements 13 as well as the support 18, and it is preferably produced as a plastic injection-molded component.

Figure 2:
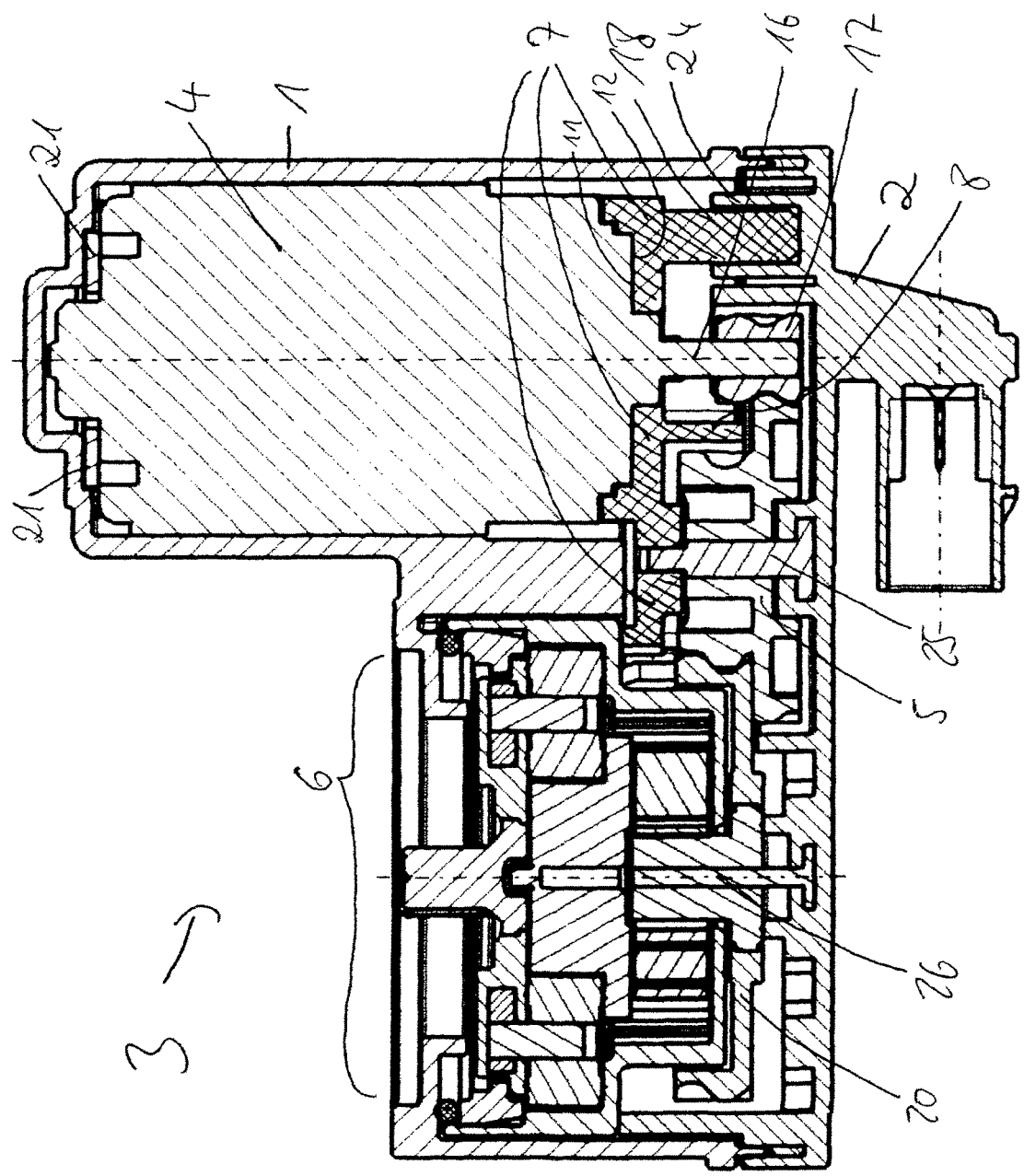

As can be seen especially in FIG. 2, the electric motor 4 is separated towards the top vis-à-vis the container 1 of the housing by an in-between insulator 21. This insulator 21 serves essentially to damp or cushion vibrations and movements between the housing container 1 and the electric motor 4. The other end of the electric motor 4 rests with its contact surface 12 on the placement or contact surface 11 of the holding means 10 of the holding frame 7. With its drive shaft 16 and the driving gear wheel 17 arranged on it, the motor runs through the opening 15 of the holding means 10, and its driving gear wheel 17 meshes with the torque transmitting device 5 that is configured as a double gear wheel. The torque transmitting device 5 is supported on a bearing 25 and, in turn, it also meshes with a spur gear 20 that is likewise arranged on the housing cover 2 on another bearing 26. This spur gear 20 is operatively connected to the drive shaft of the transmission 6 which, in this case, is configured as a planetary gear train. By means of the driven shaft of this transmission (not indicated in greater detail in the figures), the motor vehicle actuator can execute the desired movements.

Figure 3:
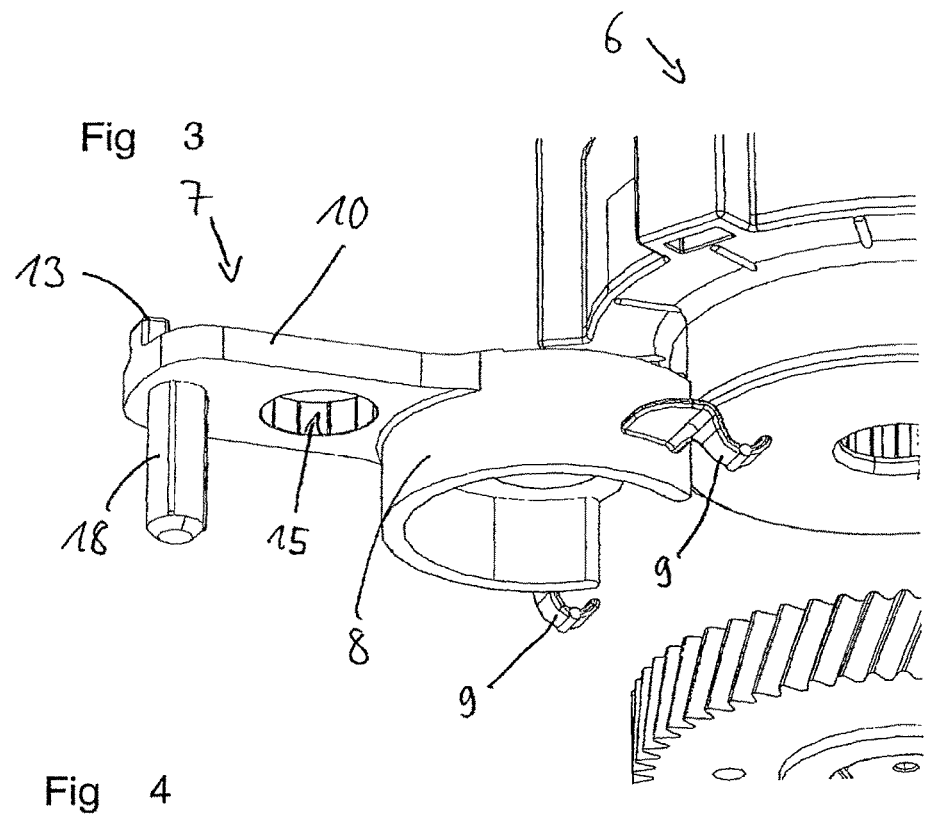
Figure 4:
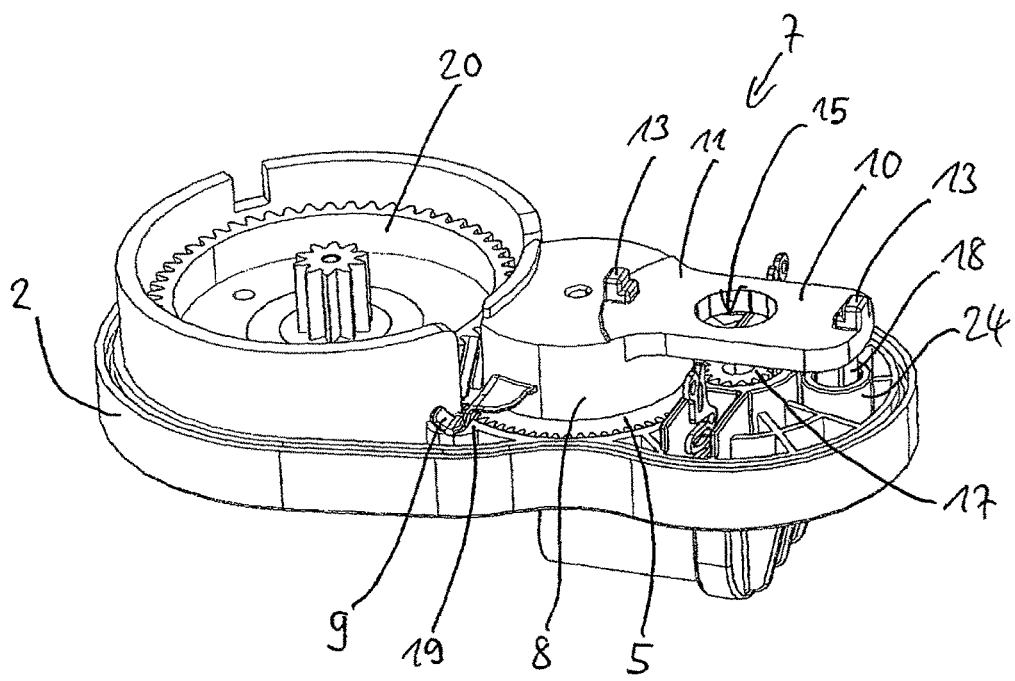

FIGS. 3 and 4 show a more detailed view of the holding frame 7, which is essential to the invention.

In this context, FIG. 3 shows the holding frame 7 of FIG. 1 in an enlarged view. The individual elements can be seen especially clearly here, particularly, the way in which the damping and/or cushioning elements or spring devices 9 as well as the holding means 10 are shaped onto the base frame 8 of the holding frame 7. It is possible to clearly see the support 18 arranged on the holding means 10 as well as a fixation element 13 that interacts with a counter-fixation element 14 of the electric motor 4 (not shown here).

FIG. 4 shows how this holding frame 7 is mounted in the housing cover 2 that is configured as a base support. Here, the spur gear 20 is also already arranged in the housing cover 2, and said spur gear 20 is operatively connected, on the one hand, to the drive shaft of the transmission 6 and, on the other hand, also to the torque transmitting device 5, whereby, in this case, the torque transmitting device 5 is configured as a double gear wheel, and in the depiction of FIG. 4, it is likewise already mounted in the housing cover 2 that is configured as a base support. In the depiction of FIG. 4, the holding frame 7 has already been placed onto this torque transmitting device 5, whereby, however, said holding frame 7 is not in contact with the torque transmitting device 5. The holding frame 7 with its base frame 8 is arranged above the torque transmitting device 5, but it is held at a distance from the torque transmitting device 5 by means of the damping and/or cushioning elements or spring devices 9 that are supported on the shoulders 19 of the housing cover 2. Here, the support 18 of the holding means 10 of the holding frame 7 is already accommodated in the support receptacle 24 of the housing cover 2 so that the entire holding frame 7 is firmly affixed in the housing cover 2. The support 18 is in contact with the bottom of the housing cover 2 so that the housing cover 2 is in direct contact with the support 18.

In the depiction according to FIG. 4, it is also possible to see the driving gear wheel 17 which has been placed onto the drive shaft 16 of the electric motor 4. However, a depiction of the electric motor 4 was dispensed with here so that the individual functional elements of the holding frame 7 can be seen more clearly.

After the motor vehicle actuator according to FIG. 4 has been pre-mounted, the electric motor 4 with its placement or contact surface 12 still has to be placed onto the placement or contact surface 11 of the holding means 10 of the holding frame 7. In order to secure the electric motor 4 against rotating, fixation elements 13 are provided on the holding means 10 and they preferably interact with the counter-fixation elements 14 of the electric motor so as to create a positive fit.

After the electric motor 4 has then been placed onto the holding means 10 of the holding frame 7, in the final step, the housing container 1 can be placed onto the housing cover 2 and the entire housing 3 can be closed. Owing to the damping and/or cushioning elements or spring devices 9 of the holding frame 7, which are supported on the shoulders 19 of the housing cover 2, movements and vibrations of the electric motor 4 inside the housing 3 can be absorbed, that is to say, cushioned and/or damped. As a result, no noise is generated by such movements and vibrations of the electric motor 4, whereby the base frame 8 of the holding frame 7 is always held at a distance from the torque transmitting device 5.

Consequently, during the entire operation of this motor vehicle actuator, it is ensured that the generation of noise is countered by the cushioning and damping properties of the holding frame 7.

LIST OF REFERENCE NUMERALS 1 container
2 housing cover
3 housing
4 electric motor
5 torque transmitting device
6 transmission
7 holding frame
8 base frame
9 damping and/or cushioning element or spring device
10 holding means
11 placement surface
12 contact surface
13 fixation element
14 counter-fixation element
15 opening
16 drive shaft
17 driving gear wheel
18 support
19 shoulder
20 spur gear
21 insulator
22 plug
23 electric connection
24 support receptacle
25 bearing
26 bearing

The invention claimed is:

1. A motor vehicle actuator, comprising:
 a housing (3) which comprises a container (1);
 a housing cover (2) configured as a base support;
 an electric motor (4) and a transmission (6) coupled to the electric motor (4) via a torque transmitting device (5), said electric motor (4), transmission (6) and torque transmitting device (5) installed inside the housing (3);
 a holding frame (7) adapted for arrangement on the housing cover (2) that supports the electric motor (4) inside the housing (3), said holding frame (7) having a holding means (10) for the electric motor (4) and a base frame (8) onto which at least one damping and/or cushioning element or spring device (9) is shaped with said at least one damping and/or cushioning means or spring device configured as a single piece with the base frame (8); and
 a support (18) extending from the holding means (10) and configured to rest directly on the housing cover (2).

2. The motor vehicle actuator according to claim 1, wherein the at least one damping and/or cushioning element or spring device (9) is a spring tongue.

3. The motor vehicle actuator according to claim 1, wherein the holding means (10) has a contact surface (11) and the electric motor (4) has a corresponding contact surface (12) adapted for contact with the contact surface (11).

4. The motor vehicle actuator according to claim 1, wherein the torque transmitting device (5) is configured as a double gear wheel.

5. The motor vehicle actuator according to claim 4, wherein the housing cover (2) has shoulders (19) on which the damping and/or cushioning elements or spring device (9) are supported, so that the base frame (8) is arranged in such a manner that it is contact-free above the torque transmitting device (5), which is configured as a double gear wheel.

6. The motor vehicle actuator according to claim 4, wherein the double gear wheel is operatively connected both to a driving gear wheel (17) of the electric motor (4) and to a spur gear (20) that is arranged on the drive shaft of the transmission (6).

7. The motor vehicle actuator according to claim 1, wherein the holding means (10) has fixation elements (13)

which, in the assembled position, correspond to counter-fixation elements (14) of the electric motor (4).

8. The motor vehicle actuator according to claim 1, wherein the holding means (10) defines an opening (15) adapted to insertably receive a drive shaft (16) of the electric motor (4), together with a driving gear wheel (17) arranged on said electric motor (4).

9. The motor vehicle actuator according to claim 1, wherein the transmission (6) is configured as a planetary gear train.

10. A brake actuator, comprising:
a housing which comprises a container;
a housing cover configured as a base support;
an electric motor and a transmission coupled to the electric motor via a torque transmitting device, said electric motor, transmission and torque transmitting device installed inside the housing;
a holding frame adapted for arrangement on the housing cover that supports the electric motor inside the housing, said holding frame having a contact surface for supporting the electric motor and a base frame onto which at least one damping and/or cushioning element or spring device is shaped, with said at least one damping and/or cushioning means or spring device configured as a single piece with the base frame; and
a support extending from the holding frame and configured to rest directly on the housing cover to support the contact surface.

11. The brake actuator according to claim 10, wherein the torque transmitting device is configured as a double gear wheel.

12. The brake actuator according to claim 11, wherein the housing cover has shoulders on which the damping and/or cushioning elements or spring devices are supported, so that the base frame is arranged in such a manner that it is contact-free above the torque transmitting device.

13. The brake actuator according to claim 11, wherein torque transmitting device is configured as a double gear wheel that is operatively connected both to a driving gear wheel of the electric motor and to a spur gear that is arranged on the drive shaft of the transmission.

14. The brake actuator according to claim 10, wherein the at least one damping and/or cushioning element or spring device is a spring tongue.

15. The brake actuator according to claim 10, wherein the holding frame has fixation elements which, in the assembled position, correspond to counter-fixation elements of the electric motor.

16. The brake actuator according to claim 10, wherein the holding frame defines an opening adapted to insertably receive a drive shaft of the electric motor, together with a driving gear wheel arranged on said electric motor.

17. The brake actuator according to claim 10, wherein the transmission is configured as a planetary gear train.

* * * * *